United States Patent
Bennett

(10) Patent No.: US 10,456,771 B2
(45) Date of Patent: Oct. 29, 2019

(54) OIL ABSORBENT PAD

(71) Applicant: Wayne Bennett, Irma (CA)

(72) Inventor: Wayne Bennett, Irma (CA)

(73) Assignee: Darryl Bossaer, Calgary (CA)

( * ) Notice: Subject to any disclaimer, the term of this patent is extended or adjusted under 35 U.S.C. 154(b) by 28 days.

(21) Appl. No.: 15/031,173

(22) PCT Filed: Sep. 12, 2014

(86) PCT No.: PCT/CA2014/050867
§ 371 (c)(1),
(2) Date: Apr. 21, 2016

(87) PCT Pub. No.: WO2015/039229
PCT Pub. Date: Mar. 26, 2015

(65) Prior Publication Data
US 2016/0271585 A1  Sep. 22, 2016

Related U.S. Application Data

(60) Provisional application No. 61/878,830, filed on Sep. 17, 2013.

(51) Int. Cl.
| | | |
|---|---|---|
| B01J 20/28 | (2006.01) |
| B01J 20/30 | (2006.01) |
| B08B 1/00 | (2006.01) |
| B32B 5/02 | (2006.01) |
| C09K 3/32 | (2006.01) |

(52) U.S. Cl.
CPC ... *B01J 20/28038* (2013.01); *B01J 20/28033* (2013.01); *B01J 20/3007* (2013.01); *B08B 1/006* (2013.01); *B01J 2220/4893* (2013.01)

(58) Field of Classification Search
CPC .............. B01J 20/28038; B01J 20/3007; B01J 20/28033; B01J 2220/4893
See application file for complete search history.

(56) References Cited

U.S. PATENT DOCUMENTS 2,039,386 A * 5/1936 Borst, Jr. .............. B29C 53/566
156/39
3,522,814 A    8/1970 Olson
(Continued)

FOREIGN PATENT DOCUMENTS

| CA | 2 472 628 A1 | 12/2005 |
| EP | 0 518 336 A1 | 12/1992 |
| GB | 1 384 217 | 2/1975 |
| GB | 2 069 361 A | 8/1981 |
| WO | 92/14002 A1 | 8/1992 |

OTHER PUBLICATIONS

Cirad, Fibre processing, Sep. 17, 2006, Cirad, date stamp, tittle, paragraph on carding.*
(Continued)

*Primary Examiner* — Mikhail Kornakov
*Assistant Examiner* — Natasha N Campbell
(74) *Attorney, Agent, or Firm* — Christensen O'Connor Johnson Kindness, PLLC; Ryan E. Dodge, Jr.

(57) ABSTRACT

There is provided an oil absorbent pad for cleaning oil on a surface having an oil absorbent body having an upper surface and a lower surface, the body being formed from fiber recovered from recycled tires, and at least one of the upper surface and the lower surface is an outermost layer of the oil absorbent pad.

15 Claims, 2 Drawing Sheets

(56) References Cited

U.S. PATENT DOCUMENTS

| | | | |
|---|---|---|---|
| 3,739,913 A * | 6/1973 | Bogosian | E02B 15/06 |
| | | | 210/242.4 |
| 3,890,988 A | 6/1975 | Lee | |
| 3,960,728 A | 6/1976 | Otzen | |
| 4,128,478 A | 12/1978 | Metzger | |
| 4,182,677 A | 1/1980 | Bocard et al. | |
| 4,813,944 A * | 3/1989 | Haney | A61F 13/5323 |
| | | | 5/484 |
| 4,949,406 A | 8/1990 | Canelli | |
| 5,478,465 A | 12/1995 | Larson et al. | |
| 5,554,285 A | 9/1996 | Bellefeuille | |
| 6,344,519 B1 | 2/2002 | Rink et al. | |
| 6,387,966 B1 | 5/2002 | Goldshtein et al. | |
| 6,541,526 B1 | 4/2003 | Goldshtein et al. | |
| 6,641,727 B1 | 11/2003 | Aldred et al. | |
| 6,969,469 B1 | 11/2005 | Xie | |
| 7,156,987 B1 | 1/2007 | Sanguinetti | |
| 7,658,857 B2 | 2/2010 | Wacome | |
| 7,666,306 B2 | 2/2010 | Fukuda et al. | |
| 2003/0111431 A1 | 6/2003 | Dew, Jr. | |
| 2003/0177799 A1 | 9/2003 | Park et al. | |
| 2007/0022672 A1 * | 2/2007 | Bachynski | E04H 9/14 |
| | | | 52/90.1 |
| 2007/0299149 A1 | 12/2007 | Goldshtein et al. | |
| 2008/0210637 A1 | 9/2008 | Fukuda et al. | |
| 2009/0270670 A1 * | 10/2009 | Daugulis | B09C 1/00 |
| | | | 588/249 |
| 2011/0284450 A1 * | 11/2011 | Chadwick | C02F 1/285 |
| | | | 210/242.4 |
| 2011/0297619 A1 | 12/2011 | Kurtzman | |

OTHER PUBLICATIONS

Classic Carder, Drum Carding, Dec. 31, 2012, Classic Carder, date stamp, first paragraph.*

Hogg's, Hogg's Weekly Instructor, 1847, Date Stamp, p. 45.*

Escer Holding Corporation, "A Technical Description of Spill-Cure™," Jun. 29, 2006, 14 pages.

Filtration+Separation, "Scrap Tyres Used to Filter Wastewater," Jan./Feb. 2007, vol. 144, Issue 1, p. 12.

McGee, T., "Make a Water Filter From Old Tires," Western Massachusetts, Nov. 21, 2006, <http://www.treehugger.com/files/2006/11/water_filter_fr.php> [retrieved Sep. 28, 2009], 1 page.

PennState Live, "Scrap Tires Can Be Used to Filter Wastewater," Pennsylvania State University, Nov. 17, 2006, <http://live.psu.ed/index.php?sec+vs_highlight&story+20894&highlight+1> [retrieved Sep. 28, 2009], 2 pages.

Tang, Z., et al., "Crumb Rubber Filtration: A Potential Technology for Ballast Water Treatment," Marine Environmental Research 61(4):410-423, May 2006.

Tang, Z., et al., "Enhanced Performance of Crumb Rubber Filtration for Ballast Water Treatment," Chemosphere 74(10):1398-1399, Mar. 2009 (Abstract).

Xie, Y., and P. Chen, "Report for 2003PA11B: Using Crumb Rubber Filtration for Ballast Water Treatment," Conference Proceedings of the 2nd International Ballast Water Management Conference and Exhibition, Singapore, 2004; and Dissertation of P. Chen, Penn State Harrisburg, Middletown, Penn., 2004; 5 pages.

Xie, Y.-F., et al., "Crumb Rubber for Wastewater Filtration," Filtration+Separation, Mar. 23, 2009, <http://www.filtsep.com/view/839/crumb-rubber-for-wastewater-filtration-/> [retrieved Sep. 28, 2009], 3 pages.

* cited by examiner

OIL ABSORBENT PAD

TECHNICAL FIELD

This relates to an oil absorbent pad made from fibres obtained from recycled tires.

BACKGROUND

When tires are recycled, the tires are broken down into rubber crumb and fibre. Generally, the fibre is considered a waste stream that is disposed of.

SUMMARY

According to an aspect, there is provided an oil absorbent pad for cleaning oil on a surface comprising an oil absorbent body having an upper surface and a lower surface, the body being formed from fibre recovered from recycled tires, and wherein at least one of the upper surface and the lower surface is an outermost layer of the oil absorbent pad.

According to another aspect, the upper and lower surfaces may comprise fibre recovered from recycled tires that contact oil and the surface directly.

According to another aspect, the oil absorbent pad may comprise a peripheral edge finished by stitching or adhesive.

According to an aspect, there is provided a method of making an oil absorbent pad, comprising the steps of obtaining fibre from recycled rubber tires and carding the fibre and forming the carded fibre into a pad body having an upper surface and a lower surface.

According to another aspect, carding the fibre may comprise using one or more carding machine.

According to another aspect, forming the fibre may comprise using one or more parallel plate mills to stretch and bind the fibres into the pad body.

According to another aspect, forming a pad body may comprise layering the fibre obtained from recycled tires to a desired thickness.

According to another aspect, the method may further comprise the step of obtaining fibre from oil absorbent pads that were previously used to absorb oil.

According to another aspect, the pad body may comprise an outermost layer formed of carded fibre on at least one of an upper surface and a lower surface of the pad body.

According to another aspect, the pad body may comprise a peripheral edge finished by stitching or adhesive.

According to an aspect, there is provided a method of cleaning an oil spill from a surface, comprising the steps of providing an oil absorbent pad comprising an oil absorbent body having an upper surface and a lower surface, the body being formed from fibre recovered from recycled tires, and at least one of the upper surface and the lower surface being an outermost layer of the oil absorbent pad; and placing one of the upper and lower surface of the oil absorbent pad in direct contact with the oil and the surface.

According to another aspect, the method may further comprise the step of cleaning the oil from the oil absorbent pad and recycling the fibres into a further oil absorbent pad.

According to another aspect, the oil absorbent pad may be formed by obtaining fibre from recycled rubber tires and carding the fibre and forming the carded fibre into the pad body.

According to another aspect, carding the fibre may comprise using one or more carding machine.

According to another aspect, forming the fibre may comprise using one or more parallel plate mills to stretch and bind the fibres into the pad body.

According to another aspect, forming a pad body may comprise layering the fibre obtained from recycled tires to a desired thickness.

According to another aspect, the oil absorbent pad may comprise a peripheral edge finished by stitching or adhesive.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
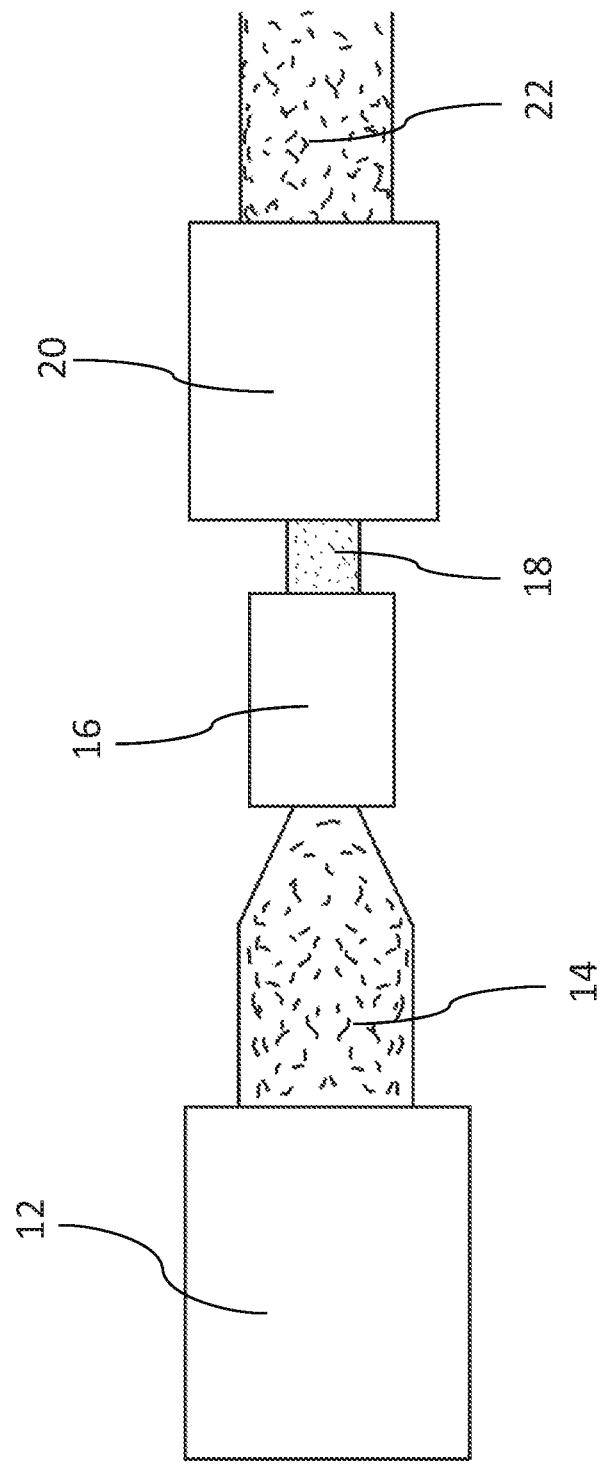
FIG. 1 is a schematic view of a carding process.

An oil absorbent pad generally identified by reference numeral 10, will now be described with reference to FIG. 1 through 3.

Rubber crumb and fibre that are obtained from recycled tires may be used to absorb oil. The recovery of rubber crumb and fibre from tires is well known in the recycling industry and will not be discussed further. While rubber crumb is used for various purposes, fibre is often considered a waste stream. However, it has been found that recovered fibre can be used to create oil absorbent pads that are useful in cleaning oil spills.

Recovered rubber fibre may be made up of various materials, such as polyester, nylon, and other materials. In order to form the oil absorbent pad it is preferred to use a mill to card the fibres obtained from recycled tires and to form the fibre into a pad body. In a preferred embodiment, the mill has one or more carding machines and one or more parallel plate mills, which are used to stretch and bind the fibres into the pad body. One example of this process will now be described. However, it will be understood by those skilled in the art that different milling processes may be used in order to form the fibre into a pad. Referring to FIG. 1, the fibre that is recovered from the separation process is first processed by a carding machine 12, such as a stretching carder, to produce a layer of fibre 14 having a width of for example, 7 feet. Carding machines in general operate to disentangle and intermix the fibre to form a material with the fibres generally aligned, and are well known in the industry and will not be discussed in detail. The layer is then reduced to a layer 18 having a width, for example, of 4 feet by folding the layer before being passed through a press 16 similar to a hammer mill. Press 16 is made up of two parallel plates that apply pressure to the bunched up layer of fibre and a rubbing, grinding movement to it. This helps bind the fibres together. After press 16, the layer of fibre is then passed through another carder 20, such as a finger carder, that then stretches the layer of fibre into a wider layer 22, such as one with a width of 7 feet. It will be understood that the dimensions given herein are by way of example only and that any reasonable dimension may be used. By forming the fibres using the methods described above, it becomes unnecessary to bind the pads or fibres such as by using encapsulating materials, additional layers, quilting, and the like.

Figure 2:
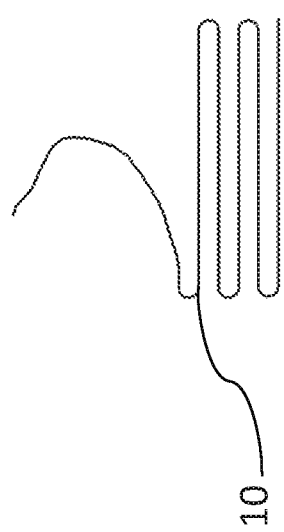
FIG. 2 is a schematic view of a layering process.

Referring to FIG. 2, once the material has passed through the final carding machine, it may be layered in order to create a pad 10 that has the desired thickness. For example, if the layer is ⅛ inch think, then 8 layers will be required in order to make a pad 10 that is 1 inch thick.

Figure 3:
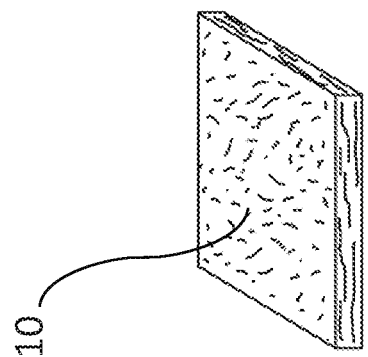
FIG. 3 is a perspective view of an oil absorbent pad.

The pad 10 may be cut to a desired size as shown in FIG. 3. Once formed, it may then be used to absorb oil by simply placing it into contact with the oil, such as by laying it over an oil spill. The fibre material acts as an absorbent and lifts the material up and into the pad. By virtue of the manufacturing steps describe above, the pad is structurally sound, even when saturated with oil such that it does not require any sheathing or additional layers or quilting in order to retain the absorptive material, which is the outermost layer of the pad on at least one, and preferably both, sides. In other words, pad 10 may be placed in direct contact with the oil and the surface on which oil has been spilled without an intervening layer. For aesthetic or structural purposes, it may be desirable to finish the edges by sewing the edges, or attaching an edging material such as by adhesive to provide a finished look to the product. This also provides some protection against accidental damage if the product is handled or transported roughly prior to use. However, the central portion of the absorbent pad 10 is generally left open and unencumbered, i.e. without any overlying layers, in order to provide direct access between the oil to be absorbed and the fibres.

Once pad 10 has been used to absorb oil, it may be recycled by cleaning the fibres and reforming the fibres into a pad. One effective approach to cleaning pad 10 of the oil may include using steam, agitation and a hydraulic press to remove the oil from the fibres, at which point the fibres may be again inserted into the carding process and used in the manufacture of other pads.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. An oil absorbent pad for cleaning oil on a surface comprising:
   an oil absorbent body having a first surface and a second surface opposite the first surface, the body being formed from fibres recovered from recycled tires and substantially separated from rubber of the recycled tires, the fibres being formed into the body by carding in a mill and internally bonded within the body sufficiently to retain the fibres and form a nonwoven fabric having a wicking structure, such that the body is structurally sound independent of any sheathing or additional layers; and
   wherein at least one of the first surface and the second surface is an outermost surface of the oil absorbent pad, the fibres that form the outermost surface being unencumbered by any overlying layer; and
   the fibres that are spaced from the outermost surface are in fluid communication with the outermost surface of the oil absorbent pad.

2. The oil absorbent pad of claim 1, wherein both of the first and second surfaces comprise outermost surfaces that are unencumbered by any overlying layer.

3. The oil absorbent pad of claim 1, comprising a peripheral edge finished by stitching or adhesive.

4. A method of making an oil absorbent pad, comprising the steps of:
   obtaining fibres from recycled rubber tires by separating the fibres from rubber of the tires;
   carding the fibres using a mill; and
   forming the carded fibres into a pad body having a first surface and a second surface opposite the first surface by internally binding the fibres within the body sufficiently to retain the fibres and form a nonwoven fabric having a wicking structure such that the body is structurally sound independent of any sheathing or additional layers and such that the fibres that form at least one of the first surface and the second surface form an outermost surface that is unencumbered by any overlying layer and fibres spaced from the outermost surface are in fluid communication with the outermost surface of the oil absorbent pad.

5. The method of claim 4, wherein carding the fibres comprises using one or more carding machines.

6. The method of claim 4, wherein forming the carded fibres comprises using one or more parallel plate mills to stretch and bind the fibres into the pad body.

7. The method of claim 4, wherein forming the carded fibres into the pad body comprises layering the carded fibres to a desired thickness.

8. The method of claim 4, further comprising the step of obtaining fibres from oil absorbent pads that were previously used to absorb oil.

9. The method of claim 4, wherein both of the first and second surfaces comprise outermost surfaces that are unencumbered by any overlying layer.

10. The method of claim 4, wherein the pad body comprises a peripheral edge finished by stitching or adhesive.

11. A method of cleaning an oil spill from a surface, comprising the steps of:
   providing an oil absorbent pad comprising:
      an oil absorbent body having a first surface and a second surface opposite the first surface, the body being formed from fibres recovered from recycled tires and substantially separated from rubber of the recycled tires, the fibres being formed into a pad by carding the fibres in a mill and internally bonding the fibres within the body sufficiently to retain the fibres and form a nonwoven fabric having a wicking structure, such that the body is structurally sound independent of any sheathing or additional layers;
      at least one of the first surface and the second surface being an outermost surface of the oil absorbent pad, the fibres that form the outermost surface being unencumbered by any overlying layer; and
   placing the outermost layer of the oil absorbent pad in direct contact with oil from the oil spill and the surface such that the fibres that form the outermost layer are directly exposed to the oil and fibres spaced from the outermost surface are in fluid communication with the outermost surface of the oil absorbent pad; and
   absorbing the oil into the oil absorbent pad.

12. The method of claim 11, further comprising the step of cleaning the oil from the oil absorbent pad and recycling the fibres into a further oil absorbent pad.

13. The method of claim 11, wherein forming the carded fibres into the pad body comprises using one or more parallel plate mills to stretch and bind the fibres into the pad body.

14. The method of claim 11, wherein forming the carded fibres into the pad body comprises layering the fibres obtained from recycled tires to a desired thickness.

15. The method of claim 11, wherein the oil absorbent pad comprises a peripheral edge finished by stitching or adhesive.

\* \* \* \* \*